United States Patent
Feng et al.

(10) Patent No.: US 8,204,914 B2
(45) Date of Patent: Jun. 19, 2012

(54) METHOD AND SYSTEM TO PROCESS MULTI-DIMENSIONAL DATA

(75) Inventors: Tim Feng, San Francisco, CA (US); Philip White, Wiesloch (DE)

(73) Assignee: SAP AG, Walldorf (DE)

( * ) Notice: Subject to any disclaimer, the term of this patent is extended or adjusted under 35 U.S.C. 154(b) by 705 days.

(21) Appl. No.: 11/950,860

(22) Filed: Dec. 5, 2007

(65) Prior Publication Data
US 2008/0172405 A1    Jul. 17, 2008

Related U.S. Application Data

(60) Provisional application No. 60/873,170, filed on Dec. 5, 2006.

(51) Int. Cl.
*G06F 17/30* (2006.01)
(52) U.S. Cl. ......... 707/803; 707/792; 707/793; 707/809
(58) Field of Classification Search .................. None
See application file for complete search history.

(56) References Cited

U.S. PATENT DOCUMENTS

| | | | |
|---|---|---|---|
| 6,122,636 A * | 9/2000 | Malloy et al. ................. | 707/102 |
| 6,366,905 B1 | 4/2002 | Netz | |
| 6,442,560 B1 * | 8/2002 | Berger et al. ......................... | 1/1 |
| 6,546,395 B1 * | 4/2003 | DeKimpe et al. ..................... | 1/1 |
| 6,970,874 B2 | 11/2005 | Egilsson et al. | |
| 7,035,843 B1 * | 4/2006 | Bellamkonda et al. ........... | 707/3 |
| 7,089,266 B2 | 8/2006 | Stolte et al. | |
| 7,133,865 B1 | 11/2006 | Pedersen et al. | |
| 2003/0084053 A1 * | 5/2003 | Govrin et al. .................. | 707/100 |
| 2003/0167277 A1 * | 9/2003 | Hejlsberg et al. ............. | 707/102 |
| 2004/0034616 A1 * | 2/2004 | Witkowski et al. ................ | 707/1 |
| 2004/0215626 A1 * | 10/2004 | Colossi et al. ................. | 707/100 |
| 2005/0015360 A1 * | 1/2005 | Cras et al. .......................... | 707/2 |
| 2005/0262136 A1 * | 11/2005 | Lloyd et al. ............... | 707/103 R |
| 2006/0053136 A1 * | 3/2006 | Ashiri ........................... | 707/101 |
| 2006/0085742 A1 | 4/2006 | Harold et al. | |
| 2006/0149778 A1 | 7/2006 | Clover | |
| 2007/0130113 A1 * | 6/2007 | Ting ................................. | 707/2 |

(Continued)

OTHER PUBLICATIONS

SAP, "BI Suite: Business Explorer", [Online]. Retrieved from the Internet: <URL:http://help.sap.com/saphelp_nw04/helpdata/en/5b/30d43b0527a17be10000000a114084/content.htm>,(Dec. 3, 2006),3 pgs.

(Continued)

*Primary Examiner* — Pierre Vital
*Assistant Examiner* — Mohammad S Rostami
(74) *Attorney, Agent, or Firm* — Schwegman, Lundberg & Woessner, P.A.

(57) ABSTRACT

An example method to process multi-dimensional data is provided. Example operations include detecting a request to generate a multi-dimensional data structure and determining that the multi-dimensional data structure is to include a multi-dimensional key figure. A first dimension of the key figure may be based primarily on a first characteristic and a second dimension of the key figure may be based primarily on a second characteristic. The method may further include augmenting a set of members associated with the second characteristic with a NULL member and generating a value for each dimension of the key figure. A value of the key figure may be determined by a pair made up from a member of the first characteristic and a member of the second characteristic. The key figure, the first characteristic, and the second characteristic may be then arranged into the requested multi-dimensional data structure.

19 Claims, 10 Drawing Sheets

U.S. PATENT DOCUMENTS

2007/0162472 A1* 7/2007 Wan et al. .................... 707/100

OTHER PUBLICATIONS

SAP, "OLAP", [Online]. Retrieved from the Internet: <URL:http://help.sap.com/saphelp_nw04/helpdata/en/7c/c3e60666cd9147bb6242dc6500cd77/content.htm>,(Dec. 3, 2006),2 pgs.

SAP, "Open Analysis Interfaces", [Online]. Retrieved from the Internet: <URL: http://help.sap.com/saphelp_nw04/helpdata/en/d9/ed8c3c59021315e10000000a114084/content.htm>,(Dec. 3, 2006),3 pgs.

Wikipedia, "OLAP", [Online]. Retrieved from the Internet: <URL:http://en.wikipedia.org/wiki/OLAP>,(Nov. 9, 2006),4 pgs.

* cited by examiner

| OFFICE | ITEMS | 2005 | 2006 | 2007 |
|---|---|---|---|---|
| OFFICE A | NULL | X | X | X |
| | COMPUTERS | X | X | X |
| | MONITORS | X | X | X |
| | DESKS | X | X | X |
| | CHAIRS | X | X | X |
| OFFICE B | NULL | X | X | X |
| | COMPUTERS | X | X | X |
| | MONITORS | X | X | X |
| | DESKS | X | X | X |
| | CHAIRS | X | X | X |

| BUCKET | ITEM | FINANCIAL CATEGORY | FINANCIAL VIEW | CALENDAR YEAR 2004 AMOUNT | 2005 AMOUNT | 2006 AMOUNT | 2007 AMOUNT | # AMOUNT | OVERALL RESULT AMOUNT |
|---|---|---|---|---|---|---|---|---|---|
| COMPUTERS | NOT ASSIGNED ITEM HEADER (S) | OPEX | 01 BUSINESS CASE | 779.050,05 | 2.506.931,01 | 959.019,99 | | | $ 4.245.001,05 |
| | | | 02 FORECAST COSTS | 474.441,00 | 1.687.947,00 | 442.343,01 | 379.767,99 | | $ 2.984.499,00 |
| | | | 03 BUDGET | 1.020.179,97 | 2.735.066,97 | 2.369.054,04 | 900.711,00 | | $ 7.025.011,98 |
| | | | 04 ACTUAL COSTS | 895.838,04 | 2.486.636,04 | 2.016.369,00 | 660.484,02 | | $ 6.059.327,10 |
| | | | RESULT | 3.169.509,06 | 9.416.581,02 | 5.786.786,04 | 1.940.963,01 | | $ 20.313.839,13 |
| | | CAPEX | 01 BUSINESS CASE | 255.660,03 | 234.755,04 | 346.124,01 | 57.234,00 | | $ 893.773,08 |
| | | | 02 FORECAST COSTS | 662.254,02 | 815.288,04 | 673.354,05 | 265.544,01 | | $ 2.416.440,12 |
| | | | 03 BUDGET | 857.559,06 | 2.478.492,03 | 2.183.939,07 | 364.040,01 | | $ 6.214.164,17 |
| | | | 04 ACTUAL COSTS | 1.081.460,01 | 2.359.512,99 | 1.836.647,94 | 336.642,00 | 330.134,00 | $ 5.614.262,94 |
| | | | RESULT | 2.856.933,12 | 5.888.048,10 | 5.040.065,07 | 1.023.460,02 | 330.134,00 | $ 15.138.640,31 |
| | | RESULT | | 6.026.442,18 | 15.304.629,12 | 10.826.851,11 | 2.964.423,03 | 330.134,00 | $ 35.452.479,44 |
| | MACBOOK PRO | OPEX | 01 BUSINESS CASE | | 181.945,98 | 71.553,96 | | | $ 253.499,94 |
| | | | 02 FORECAST COSTS | | 216.564,00 | 83.650,02 | | | $ 300.214,02 |
| | | | 03 BUDGET | | 207.820,02 | 83.073,96 | | | $ 290.893,98 |
| | | | 04 ACTUAL COSTS | | 195.663,96 | 84.732,00 | | | $ 280.395,96 |
| | | | RESULT | | 801.993,96 | 323.009,94 | | | $ 1.125.003,90 |
| | | CAPEX | 01 BUSINESS CASE | | 356.264,04 | 178.132,02 | | | $ 534.396,06 |
| | | | 02 FORECAST COSTS | | 409.348,08 | 204.674,04 | | | $ 614.022,12 |
| | | | 03 BUDGET | | 436.267,92 | 218.133,96 | | | $ 654.401,88 |
| | | | 04 ACTUAL COSTS | | 396.448,08 | 200.336,04 | | | $ 596.784,12 |
| | | | RESULT | | 1.598.328,12 | 801.276,06 | | | $ 2.399.604,18 |
| | | RESULT | | | 2.400.322,08 | 1.124.286,00 | | | $ 3.524.608,08 |
| | MAC MINI | OPEX | 01 BUSINESS CASE | 369.984,96 MXN | 409.983,00 MXN | 363.092,01 MXN | 163.464,99 MXN | | 1.306.524,96 MXN |
| | | | 02 FORECAST COSTS | 268.479,99 MXN | 353.787,93 MXN | 342.828,99 MXN | 163.779,99 MXN | | 1.134.876,90 MXN |
| | | | 03 BUDGET | 290.013,99 MXN | 359.223,99 MXN | 362.137,02 MXN | 170.705,01 MXN | | 1.182.080,01 MXN |
| | | | 04 ACTUAL COSTS | 287.706,00 MXN | 346.154,01 MXN | 109.399,98 MXN | | | 743.259,99 MXN |
| | | | RESULT | 1.216.184,94 MXN | 1.469.148,93 MXN | 1.177.458,00 MXN | 503.949,99 MXN | | 4.366.741,86 MXN |
| | | CAPEX | 01 BUSINESS CASE | 1.263.948,00 MXN | 1.098.549,96 MXN | 848.159,01 MXN | 677.538,99 MXN | | 3.888.195,96 MXN |
| | | | 02 FORECAST COSTS | 952.123,98 MXN | 1.020.959,97 MXN | 659.529,00 MXN | 605.223,00 MXN | | 3.237.835,95 MXN |
| | | | 03 BUDGET | 1.137.617,94 MXN | 1.089.112,98 MXN | 645.128,97 MXN | 675.019,98 MXN | | 3.546.879,87 MXN |
| | | | 04 ACTUAL COSTS | 1.090.659,00 MXN | 1.035.773,01 MXN | 240.760,02 MXN | | | 2.367.192,03 MXN |
| | | | RESULT | 4.444.348,92 MXN | 4.244.395,92 MXN | 2.393.577,00 MXN | 1.957.781,97 MXN | | 13.040.103,81 MXN |
| | | RESULT | | 5.660.533,86 MXN | 5.713.544,85 MXN | 3.571.035,00 MXN | 2.461.731,96 MXN | | 17.406.845,67 MXN |

METHOD AND SYSTEM TO PROCESS MULTI-DIMENSIONAL DATA

CLAIM OF PRIORITY

The present patent application claims the priority benefit of the filing date of U.S. provisional application No. 60/873,170 filed Dec. 5, 2006, the entire content of which is incorporated herein by reference.

FIELD

This application relates to a method and system to process multi-dimensional data.

BACKGROUND

On-Line Analytical Processing (OLAP) is an approach that allows decision-makers to quickly and interactively analyze multi-dimensionally modeled data appropriate to various contexts. Example applications of OLAP include business reporting for sales, marketing, management reporting, business process management, budget forecasting, financial reporting, and similar areas.

OLAP systems analyze data from a number of different perspectives, and support complex analysis against large data sets. There is a number of different types of OLAP architectures, including Relational Online Analytical Processing (ROLAP), Multi-dimensional OLAP (MOLAP), and Hybrid Online Analytic Processing (HOLAP).

BRIEF DESCRIPTION OF DRAWINGS

Some embodiments are illustrated by way of example and not limitation in the figures of the accompanying drawings in which:

FIG. 10 is a further example view generated in response to a request from an OLAP client, according to one example embodiment.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

OLAP functionality may be implemented by restructuring data stored in various tables, into a so-called "OLAP cube." An OLAP cube may be viewed as a database specially designed to be optimized for efficient data retrieval and reporting. One feature of the OLAP approach is categorizing data into "dimensions" and "facts." Facts represent values such as values associated with actual or projected costs, units of merchandise, etc. that can be counted, aggregated, and compared. Dimensions, on the other hand, are various characteristics by which measures can be summarized, such as expense categories, employees, or calendar years. A dimension (or characteristic) may itself have a plurality of dimensions that may also be referred to as members (e.g., the employees dimension may have a temporary employees dimension and a permanent employee dimension). In an OLAP cube, a fact that is calculated based on one or more characteristics may be referred to as a key figure. While the term "cube" typically refers to a geometric object that has three dimensions, an OLAP cube may have many more dimensions. However, the term "cube" (or "cube model") continues to apply.

For example, an OLAP cube may be generated for a cost key figure that is qualified by two dimensions (or characteristics): by the item dimension and by the group dimension. The cost key figure for such a cube is calculated as cost values for each item in each group of items, the item dimension being the primary qualifying dimension (or the primary qualifying characteristic). Another OLAP cube may be generated for a cost key figure that is qualified primarily by the group dimension, and also by the period dimension. The cost key figure for such a cube is calculated as cost values for all items associated with each particular group of items, a separate such cost value may be calculated for each period (e.g., for each calendar year) in the period dimension. Because the OLAP cubes include pre-calculated values, any queries to request retrieval of these values can be processed without delay.

OLAP cubes may be built based on underlying data schema where data is stored in tables that can be organized, e.g., as a star schema or a snowflake schema of tables. In a star schema, the central table is a fact table that lists core facts that may be used as the subject of a query. A number of dimension tables (or characteristic tables) are linked to the fact table and indicate how aggregations of relational data may be analyzed. The calculation of the aggregations and the base data may be combined to make up an OLAP cube, which can potentially contain answers to every query that can be answered against the stored data. The aggregations are often identified as "views" of the data.

As mentioned above, an OLAP cube may be generated for a key figure that has one or more qualifying characteristics, of which one may be considered a primary qualifying characteristic. For example, where the cost key figure is calculated for individual items in each category, and not for the total cost for the entire category, the item characteristic is considered a primary qualifying characteristic. In another OLAP cube, where the cost key figure is generated for the total cost for all items associated with each member (or dimension) of the group characteristic, the group characteristic is considered a primary qualifying characteristic. A characteristic that has members that themselves have their own members (e.g., an "equipment" characteristic that is associated with a "computers" characteristic, "computers" being a subcategory of "equipment") may be termed a bucket characteristic. A characteristic that may be a member of a bucket characteristic may be termed an item characteristic.

In one example embodiment, a method and system are provided to generate a cube model (or merely a cube) that stores key figure values based on different primary qualifying characteristics, e.g., a cube model that stores at least one key figure value that corresponds to a key figure value generated based primarily on an item characteristic and also stores at least one key figure value that corresponds to a key figure value generated based primarily on the associated bucket characteristic. Such a cube model may be termed a combination cube model. A key figure for a combination cube model may be calculated as a function of C1 and C2, where C1 is a member of a bucket characteristic and C2 is a member an associated item characteristic. As is explained in more detail below, one of the key figure values is calculated for the C1 and C2 pair, where C2 is a NULL member (sometimes referred to as an exclusive dimension) of the item characteristic. The key figure value for such pair is calculated as the total value for all members of the item characteristic. Thus, while a combination cube is generated based formally on only one primary characteristic, the resulting set of key figure values includes the total value for all members of the item characteristic in addition to the key figure values for individual members of the item characteristic. Conversely, because the resulting set of key figure values includes the total value for all members of the item characteristic in addition to the key figure values for individual members of the item characteristic, a key figure associated with a combination cube model may be referred to as a combination key value.

Example cube data models generated to store key figure values based on different primary qualifying characteristics may be utilized advantageously, e.g., to permit users to quickly access data representing various items from a category as well as data representing the sum total associated with such items. For example, the approach described herein, in one example embodiment, may permit Portfolio Managers to display informative and accurate views reporting how much budget has been allocated to any given Portfolio Item and compare it, in the same view, to the planned and actual costs for a specific period of time by Financial Groups and Financial Categories. A method and system to process multi-dimensional data in general and, in particular, to generate a cube model that stores key figure values based on different primary qualifying characteristics may be implemented, in one example embodiment, in the context of a network environment. An example network environment is illustrated in FIG. 1.

Figure 1:
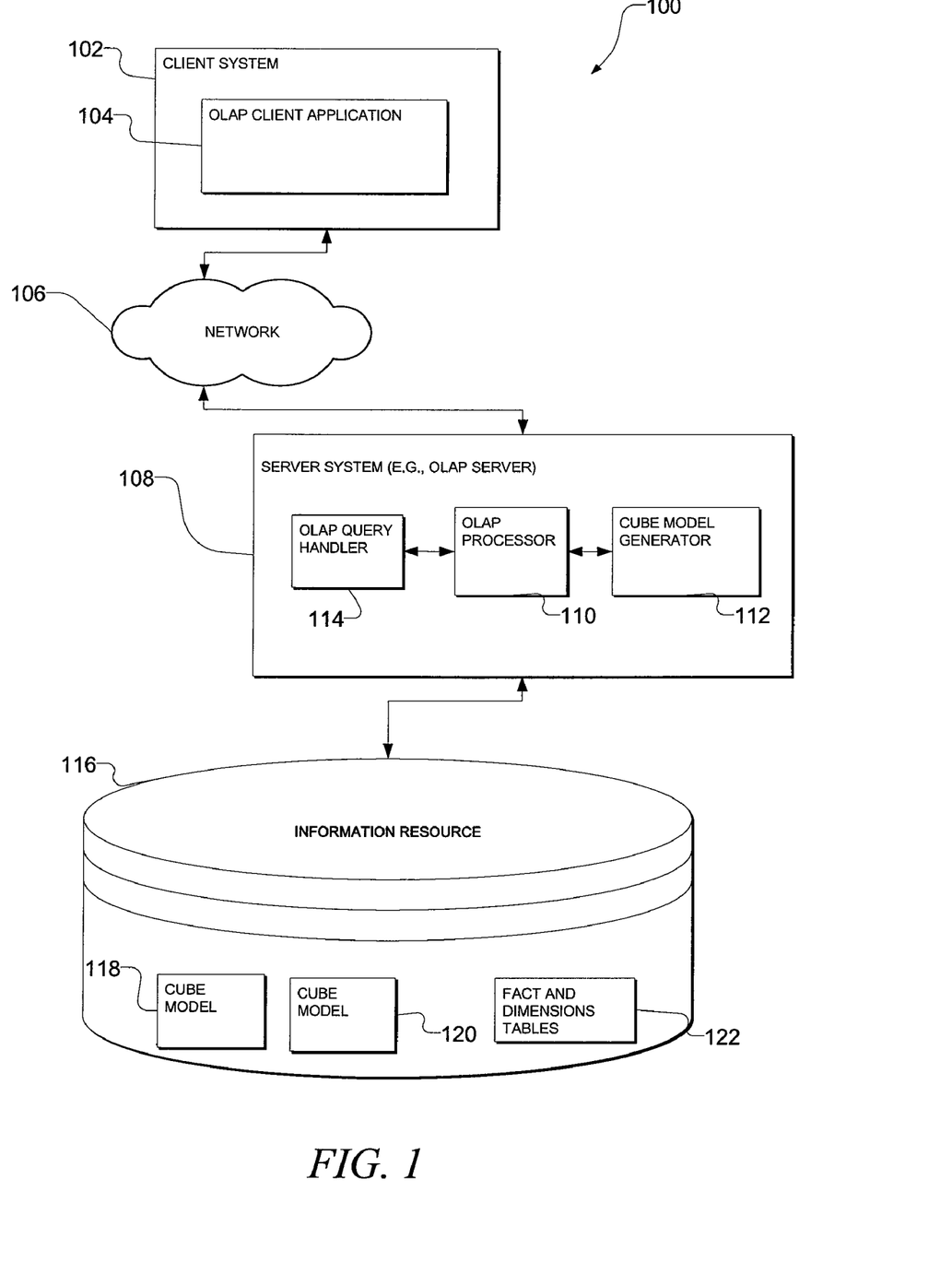
FIG. 1 is a diagrammatic representation of an example network environment, within which a method and system to process multi-dimensional data may be implemented.

FIG. 1 is a diagrammatic representation of an example network environment 100, within which a method and system to process multi-dimensional data may be implemented. As shown in FIG. 1, the network environment 100 may include a client system 102, a server system (here, an OLAP server) 108 and an information resource 116. The client system 102 may run an OLAP client application 104 (or simply an OLAP client) and may have access to the OLAP server system 108 via a communications network 106. The communications network 106 may be a public network (e.g., the Internet, a wireless network, etc.) or a private network (e.g., a local area network (LAN), a wide area network (WAN), Intranet, etc.).

The OLAP server 108 includes an OLAP processor 110, a cube model generator 112, and an OLAP query handler 114. The OLAP processor 110 is configured to cooperate with the cube model generator 112 and the OLAP query handler 114. The cube model generator 112 may be configured to generate cube models based on the requirements provided to the OLAP server 108. In one example embodiment, the cube model generator 112 is configured to generate a cube model that stores key figure values based on different primary qualifying characteristics to permit users to access, in the same context, data that represents individual items as well as data that represents an aggregation of these individual items. A cube model that stores key figure values based on different primary qualifying characteristics may be termed a combination cube. The OLAP query handler 114 is configured, according to one embodiment, to process queries directed to a combination cube. For example, the OLAP query handler 114 may be configured to process a query directed to a certain cube model to retrieve a key figure calculated for a single item from a bucket, as well as another key figure calculated for an aggregation of all items in the bucket.

The OLAP server 108 that hosts the cube model generator 112 and the OLAP query handler 114 may be configured to be in communication with the information resource 116. The information resource 116, in one example embodiment, is configured to store data models (e.g., data models that are stored as a plurality of tables 122), as well as the cube models (e.g., a cube model 118 and a cube model 120) generated by the cube model generator 112. A data model may be stored as one or more fact tables and one or more dimension tables. A fact table, in one example embodiment, stores key figures. A particular type of value is designated within a data model as a key figure if it is a value that can be calculated based on various qualifying characteristics. Any qualifying characteristic present in the data model is referred to as a dimension. Dimensions are stored within the data model in so-called dimension tables. Dimension tables may be linked to one or more fact tables.

In one example embodiment, the OLAP client 104 may issue queries to the OLAP query handler 114 of the OLAP server 108, the OLAP query handler 114 being communicatively coupled to an OLAP processor 110. The OLAP processor 110, in turn, makes multi-dimensionally formatted data available to the OLAP client 104, and may be optimized for analysis and reporting on very large data sets. To this end, the OLAP processor 110 is shown coupled to an information resource 116 that may store multi-dimensional data structures, in the example form of OLAP cube models 118 and 120. It will be appreciated that the information resource 116 may also include multiple other types of data structures including tables, objects, etc.

Returning to the OLAP query handler 114, the OLAP query handler 114 may be configured to translate the OLAP-formatted query received, e.g., from the OLAP client 104, into queries that are formulated to retrieve information associated with a cube model that stores key figure values based on different primary qualifying characteristics. For example, a query may specify that data is to be retrieved from a certain cube model generated for a cost key figure that satisfies certain criteria, as specified below.

GET DATA FROM CUBE 01 WHERE BUCKET CHARACTERISTIC=("A") AND ITEM CHARACTERISTIC=("Z" OR NULL)

The view returned in response to the query above includes the cost calculated for item "Z" in bucket "A," and also the total cost calculated for all items in bucket "A." The resulting view, therefore, permits easy comparison of a value generated for a single item in the bucket to the value associated with all items in the bucket. The OLAP query handler 114, in one embodiment, is responsible for formatting and returning of multiple key figure values, via the communications network 106, to the OLAP client 104 for presentation to a user. As mentioned above, the OLAP client 104 may be a dedicated client for interfacing with the OLAP server 108. In a further embodiment, the client application 104 may be a web browser, in which case the OLAP query handler 114 may operate to generate markup language documents (e.g., Hyper Text Markup Language (HTML) documents) or other interface information that is presentable by the client application 104 to a user. The key values returned by the OLAP query handler 114 to the client application 104 may be tables or graphs, for example, which present key values that may be retrieved from a cube model generated based on an OLAP data model and stored in the information resource 116.

Figure 2:
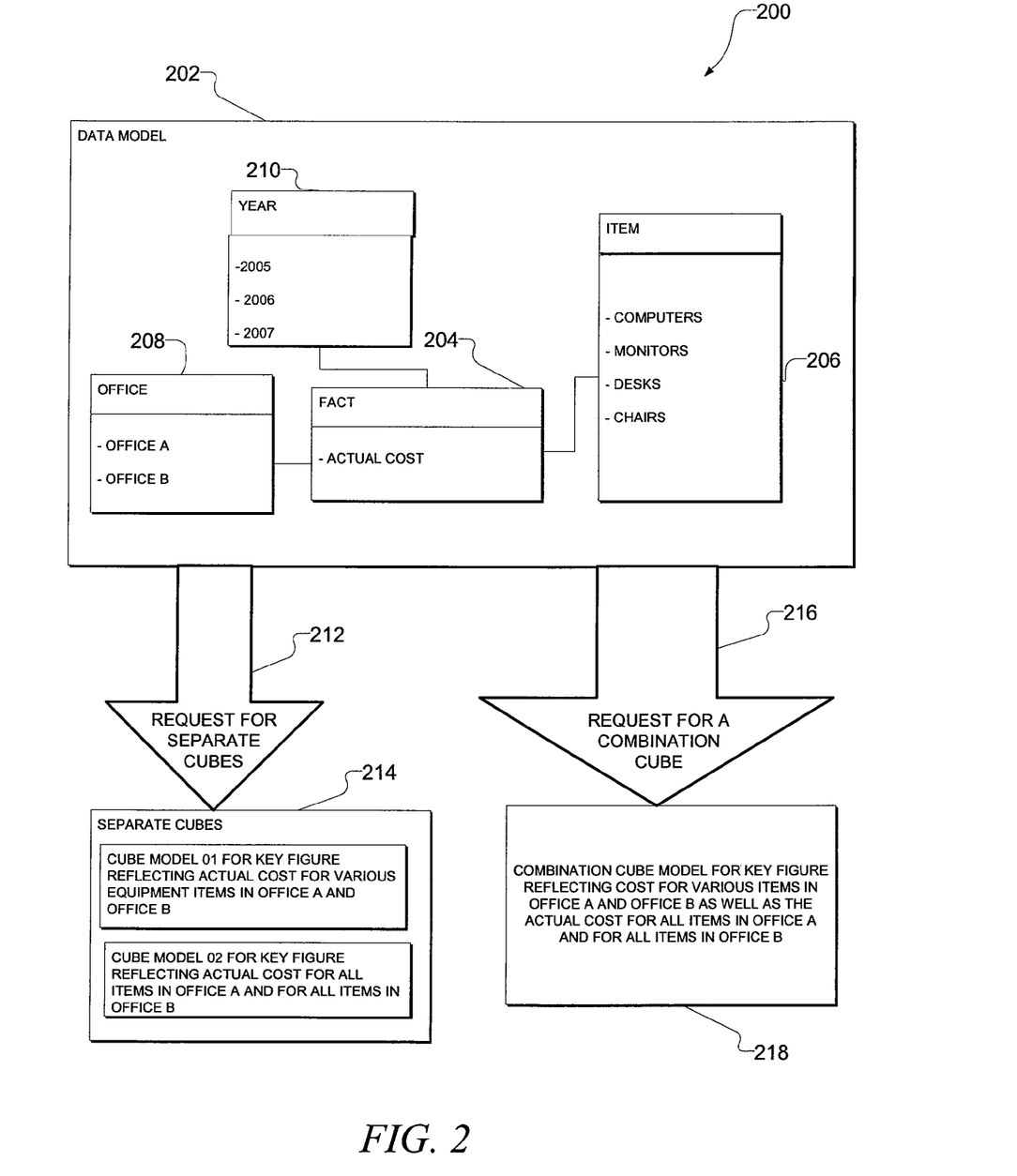
FIG. 2 is a high-level diagrammatic representation of utilizing an example data model to generate multi-dimensional data structures.

FIG. 2 is a high-level diagrammatic representation 200 of utilizing an example data model to generate multi-dimensional data structures. As shown in FIG. 2, an example data model 202 may be used to generate separate cube models 214 (in response to a request 212), as well as a combination cube model 218 (in response to a request 216). The data model 202 comprises a fact table 204 and several dimension tables 206, 208, and 219 that are linked to the fact table 204. The fact table 204 includes one entry: "actual cost." It will be noted that a fact table may include a plurality of fact entries, e.g., a "projected cost" entry in addition to the "actual cost" entry. A dimension table 206 titled "Item" includes entries that represent various equipment items that have been purchased for an office. A dimension table 206 titled "Office" includes entries that represent different offices, for which the equipment items may have been purchased. Table 210, titled "Year," includes entries that represent calendar years, for which costs may need to be calculated. In response to the request 212 to build one cube model for a key figure based primarily on the "Item" dimension 206 of the data model 202, and another cube model for a key figure based primarily on the "Office" dimension 208 of the data model 202, separate cube models 214 may be generated. One resulting cube model (cube model 01) may be to store pre-calculated values of actual cost associated with each equipment item in each of the offices and another cube model (cube model 02) may be to store pre-calculated values of total cost associated with all equipment items in each of the offices.

Each of the separate cube models 214 may also include values calculated to represent cost for each particular equipment item in each office for each calendar year. The resulting cube model is said to be built for the key figure that is qualified primarily by the "Item" dimension 206, and also by the "Office" dimension 208 and by the "Year" dimension 210. The separate cube models 214 may be stored in the information resource 116 (illustrated in FIG. 1) and facilitate quick retrieval of the pre-calculated values. For example, a query requesting a key figure value from cube model 01, and specifying the "Item" characteristic to be "Computers," the "Office" characteristic to be "Office A," and the "Year" characteristic to be "2006," would return a value representing a dollar amount spent on computers in Office A in the 2006 calendar year. An example table that represents cube model 01 is illustrated in FIG. 3.

Figure 3:
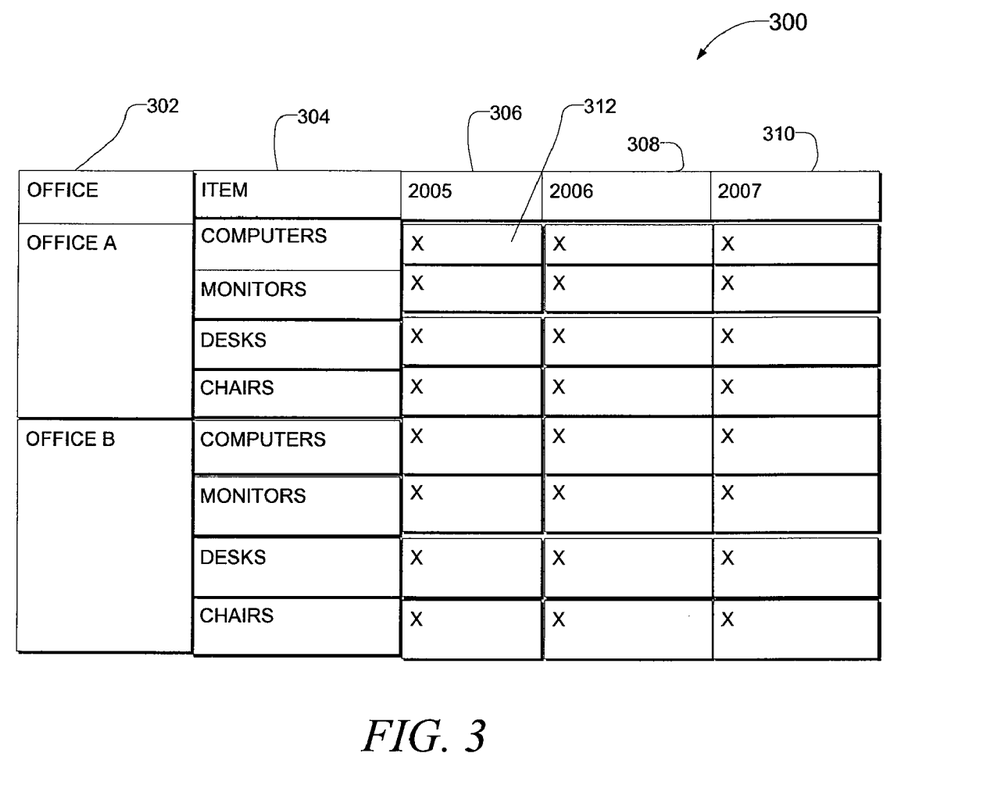
FIG. 3 is a diagrammatic representation of a cube model for a key figure based primarily on an item characteristic, according to one example embodiment.

As shown in FIG. 3, a table 300 includes a column 302 dedicated to the "Office" characteristic and a column 304 dedicated to the "Item" characteristic. The last three columns, 306, 308, and 310, represent the calendar year for which key figure values (e.g., a value that appears in field 312) have been calculated.

Figure 4:
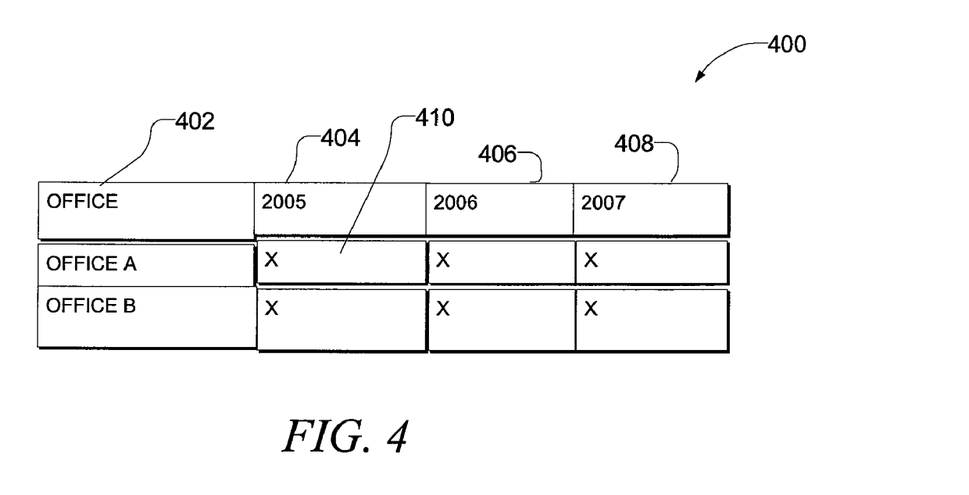
FIG. 4 is a diagrammatic representation of a cube model for a key figure based primarily on a bucket characteristic, according to one example embodiment.

FIG. 4 illustrates an example table 400 that represents cube model 02. As shown in FIG. 4, a table 400 includes a column 402 dedicated to the "Office" characteristic and columns 404, 406, and 408 that represent the calendar year for which key figure values (e.g., a value that appears in field 410) have been calculated. The key figure values in the table 400 represent the total cost of equipment for each office per calendar year.

Returning to FIG. 2, the data model 202 may be used to build a combination cube model 218 in response to the request 216 to build a single cube model where at least one key figure value is based primarily on the "Item" dimension 206 of the data model 202, and at least one key figure value is based primarily on the "Office" dimension 208 of the data model 202. The resulting cube model 218 may be to store pre-calculated values of actual cost associated with each equipment item in each of the offices and also to store pre-calculated values of total cost associated with all equipment items in each of the offices. The cube model 218 may also include values calculated to represent cost for each particular equipment item in each office and the total cost for each office for each calendar year. The resulting cube model is said to be built for the key figure that is qualified primarily by the "Item" dimension 206. In this example, however, one of the members of the "Item" dimension is the NULL member. Therefore, the key figure value that is calculated based on the NULL entry of the "Item" dimension and on some non-NULL entry of the "Office" dimension represents the total cost for all items associated with the non-NULL entry of the "Office" dimension, and thus may be said to be based primarily on the "Office" dimension. The cube model 218 may also include values calculated to represent total cost and individual items cost incurred for each calendar year.

The cube model 218 may be stored in the information resource 116 (illustrated in FIG. 1) and permit quick retrieval of the pre-calculated values. For example, a query requesting a key figure value from the cube model 218, and specifying the "Office" characteristic to be "Office A," the "Item" characteristic to be "Computers" or NULL, and the "Year" characteristic to be "2006," would return a value representing the dollar amount spent on computers in Office A in 2006 calendar year, as well as the dollar amount spent on all equipment items in Office A in 2006 calendar year. An example table that represents the cube model 218 is illustrated in FIG. 5.

Figure 5:
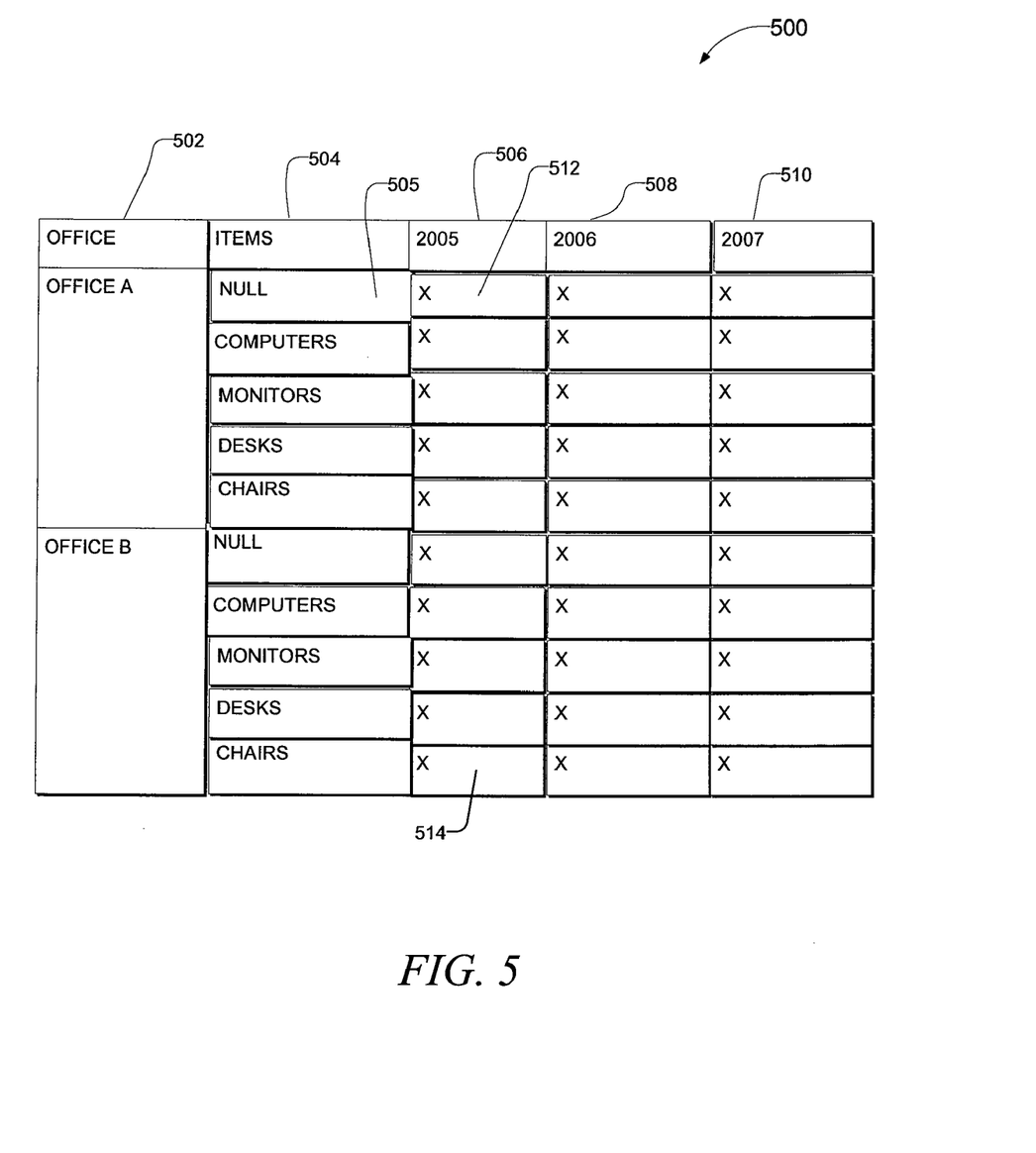
FIG. 5 is a diagrammatic representation of a combination cube model for a key figure where at least one key figure value is based primarily on an item characteristic and at least one key figure value is based primarily on a bucket characteristic, according to one example embodiment.

As shown in FIG. 5, a table 500 includes a column 502 dedicated to the "Office" characteristic and a column 504 dedicated to the "Item" characteristic. Each office entry in the "Office" characteristic has several associated members from the "Item" characteristic, including a NULL entry (e.g., a field 505). The last three columns, 506, 508, and 510, represent the calendar year for which key figure values have been calculated. Each key figure value is calculated based primarily on the "Item" characteristic (e.g., a value that appears in field 514), unless the "Item" entry is NULL, in which case the associated key figure value (e.g., a value that appears in field 512) is calculated based primarily on the "Office" characteristic. As mentioned above, in this example, a key figure value that is based primarily on the "Office" characteristic is calculated as the total cost for all equipment items for a particular office. As mentioned above, with reference to FIG. 1, a combination cube model may be generated by the cube model generator 112. Example modules that may be included in a cube model generator that is configured to generate a combination cube model may be described with reference to FIG. 6.

Figure 6:
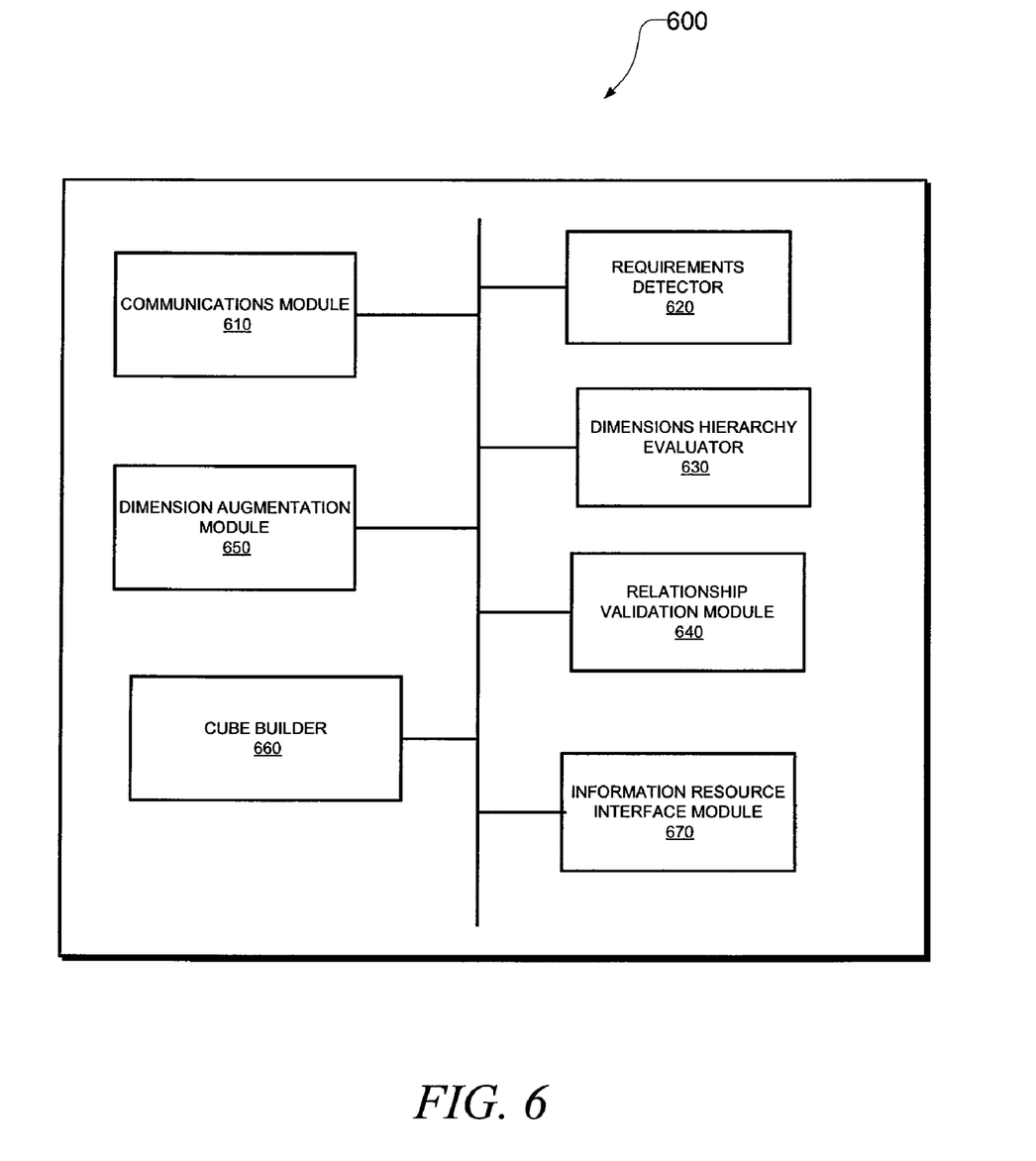
FIG. 6 is a diagrammatic representation of a cube model generator configured to generate a combination cube model, according to one example embodiment.

FIG. 6 is a diagrammatic representation of a cube model generator 600, in accordance with one example embodiment. As shown in FIG. 6, the cube model generator 600 includes a communications module 610, a requirements detector 620, a dimensions hierarchy evaluator 630, a relationship validation module 640, a dimension augmentation module 650, a cube builder 660, and an information resource interface module 670. In one example embodiment, the communications module 610 is configured to detect a request to generate a multi-dimensional data structure. The requirements detector 620 may be configured to determine that the requested multi-dimensional data structure is to include a multi-dimensional key figure such that that one or more dimensions of the key figure are based primarily on a first characteristic and at least one dimension of the key figure is based primarily on a second characteristic. The dimensions hierarchy evaluator 630 and the relationship validation module 640 may cooperate with the requirements detector 620 to determine any existing hierarchy associated with the characteristics provided with the request to generate a multi-dimensional data structure and also to determine whether, based on the determined hierarchy information, the client is to be notified that there is an error associated with the request.

The augmentation module 650, in one example embodiment, is provided to accommodate requests for multi-dimensional data structures where different dimensions of the associated key figure are to be based on different qualifying characteristics. The augmentation module 650 may be configured to augment a set of members associated with a qualifying characteristic from the request with a NULL dimension (or member). The cube builder 660 may be configured to generate a value for each dimension of the key figure. Each value of the key figure may be calculated as a function of a pair of parameters made up from a member of the first characteristic and a member of the second characteristic from the request. The cube builder 660 may also be configured to arrange the generated key figure, the first characteristic, and the second characteristic into the requested multi-dimensional data structure. The information resource interface module 670 may be configured to store the generated multi-dimensional structure (e.g., a combination cube model) in the storage system such as the information resource 116 of FIG. 1. An example method to generate a combination cube model may be described with reference to FIG. 7.

Figure 7:
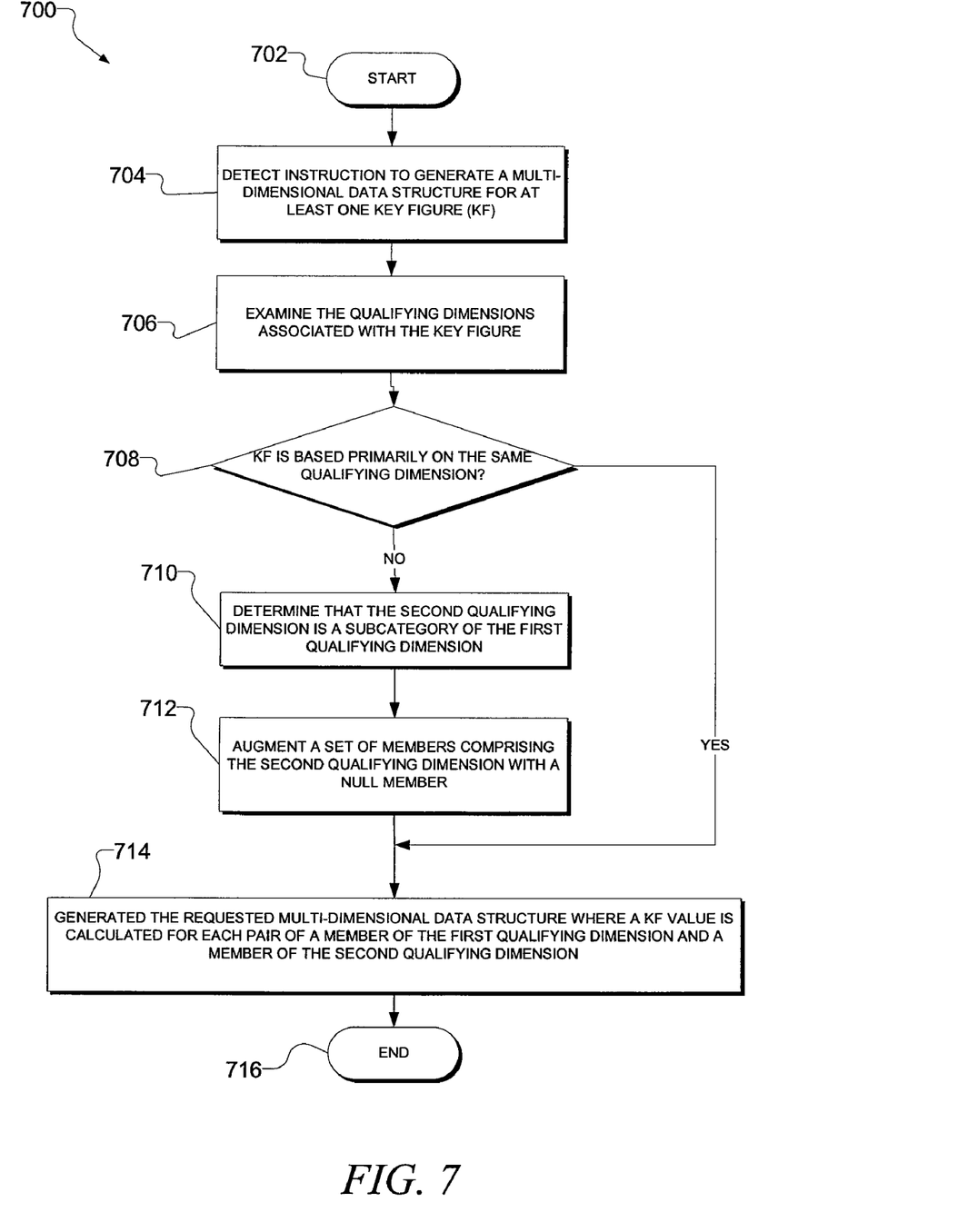
FIG. 7 is a flow chart of a method to generate a combination cube model, according to one example embodiment.

FIG. 7 is a flow chart of a method 700 to generate a combination cube model, according to one example embodiment. The method 700 may be performed by processing logic that may comprise hardware (e.g., dedicated logic, programmable logic, microcode, etc.), software (such as is run on a general purpose computer system or a dedicated machine), or a combination of both. In one example embodiment, the processing logic resides at the OLAP server 108 of FIG. 1 and, specifically, at the cube model generator 112. In another example embodiment, the processing logic may be distributed between various servers comprising the server system 108 of FIG. 1.

As shown in FIG. 7, the method 700 commences at operation 702. At operation 704, the communications module 610 detects instructions to generate a multi-dimensional data structure (e.g., an OLAP cube) for at least one key figure. The requirements detector 620 parses the request to determine the qualifying dimensions for the requested key figure and examines the qualifying dimensions (operation 706) to determine whether all dimensions of the requested key figure are to be primarily based on the same qualifying dimension (operation 708).

If it is determined, at operation 708, that all dimensions of the requested key figure are to be primarily based on the same qualifying dimension, the method 700 proceeds directly to operation 716. If it is determined, at operation 708, that all dimensions of the requested key figure are to be primarily based on different qualifying dimensions, e.g., that at least one dimension of the requested key figure is to be based primarily on a first qualifying dimension and that at least one dimension of the requested key figure is to be based primarily on a second qualifying dimension, the method 700 proceeds to operation 710.

At operation 710, the dimensions hierarchy evaluator 630 determines that the second qualifying dimension is a subcategory of the first qualifying dimension. Next, the dimension augmentation module 650 augments the set of members associated with the second qualifying dimension with a so-called exclusive dimension represented by a NULL member, at operation 712. The resulting set of members of the second qualifying dimension includes all of the original members and a new member, which is the NULL member. At operation 714, the cube builder 660 generates the requested multi-dimensional data structure, where a key figure value is calculated for each pair consisting of a member of the first qualifying dimension and a member of the second qualifying dimension. A key figure value associated with a pair where a member of the second qualifying dimension is a non-NULL member is calculated based primarily on the first qualifying dimension. A key figure value associated with a pair where a member of the second qualifying dimension is the NULL member is calculated based primarily on the second qualifying dimension. The key figure, the first qualifying dimension, and the second qualifying dimension are then arranged into the requested multi-dimensional data structure (here, a combination cube model) and stored in the information resource interface module 670. The method 700 ends at operation 716. As mentioned above, queries associated with OLAP cube models may be processed by the OLAP query handler 114 of FIG. 1. Example modules of the OLAP query handler 114 may be described with reference to FIG. 8.

Figure 8:
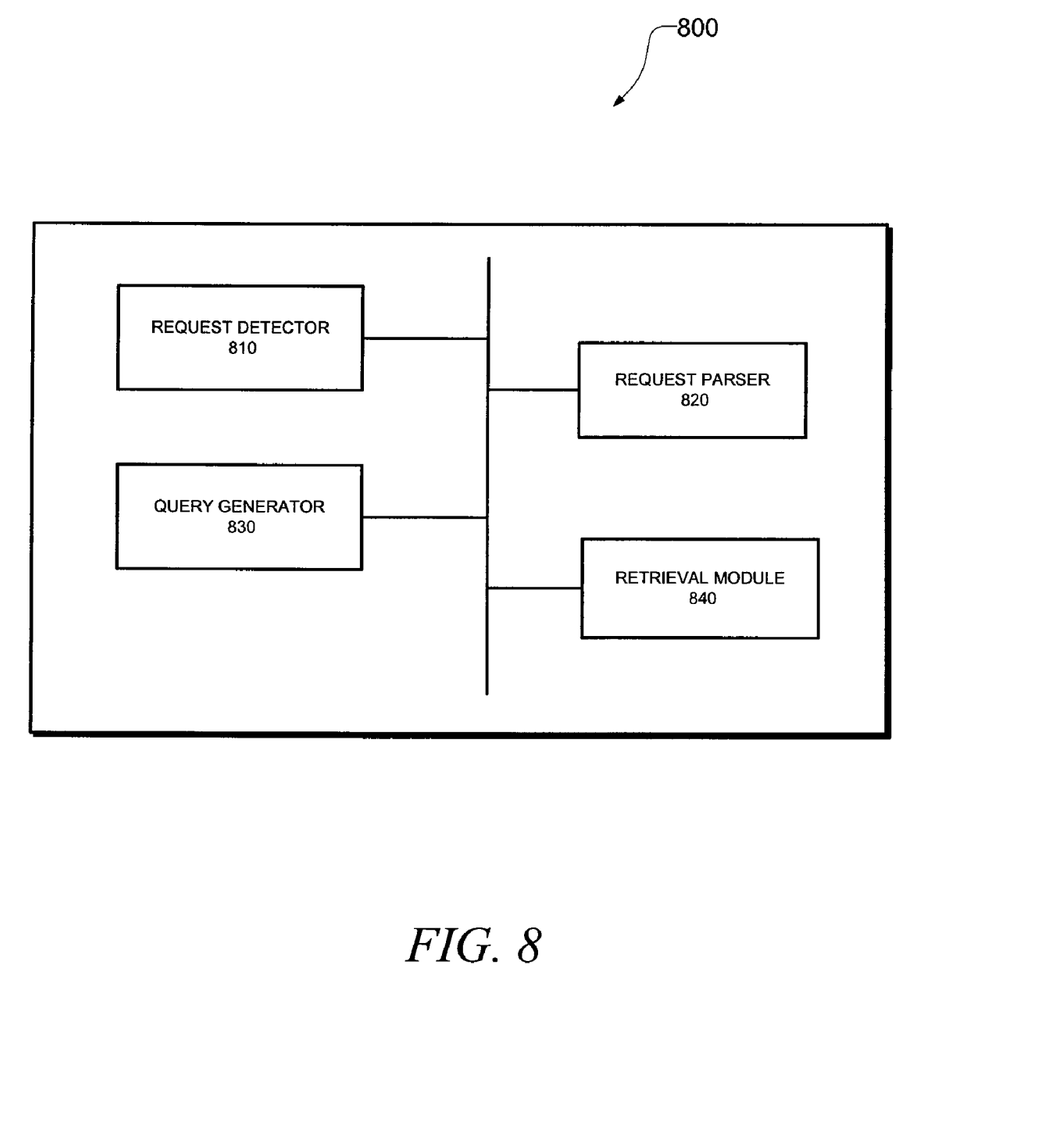
FIG. 8 is a diagrammatic representation of a query handler configured to handle queries directed to cube models, according to one example embodiment.

As shown in FIG. 8, an example query handler 800 includes a request detector 810, a request parser 820, a query generator 830, and a retrieval module 840. The request detector 810 may be configured to receive a request for data against a multi-dimensional data structure such as a combination OLAP cube. The request parser 820 may be configured to parse the request and to determine any qualifying dimensions (or characteristics) referenced by the request. The query generator 830 may be configured to generate a query directed to an OLAP cube model. The retrieval module 840 may be configured to retrieve data based on the query.

Figure 9:
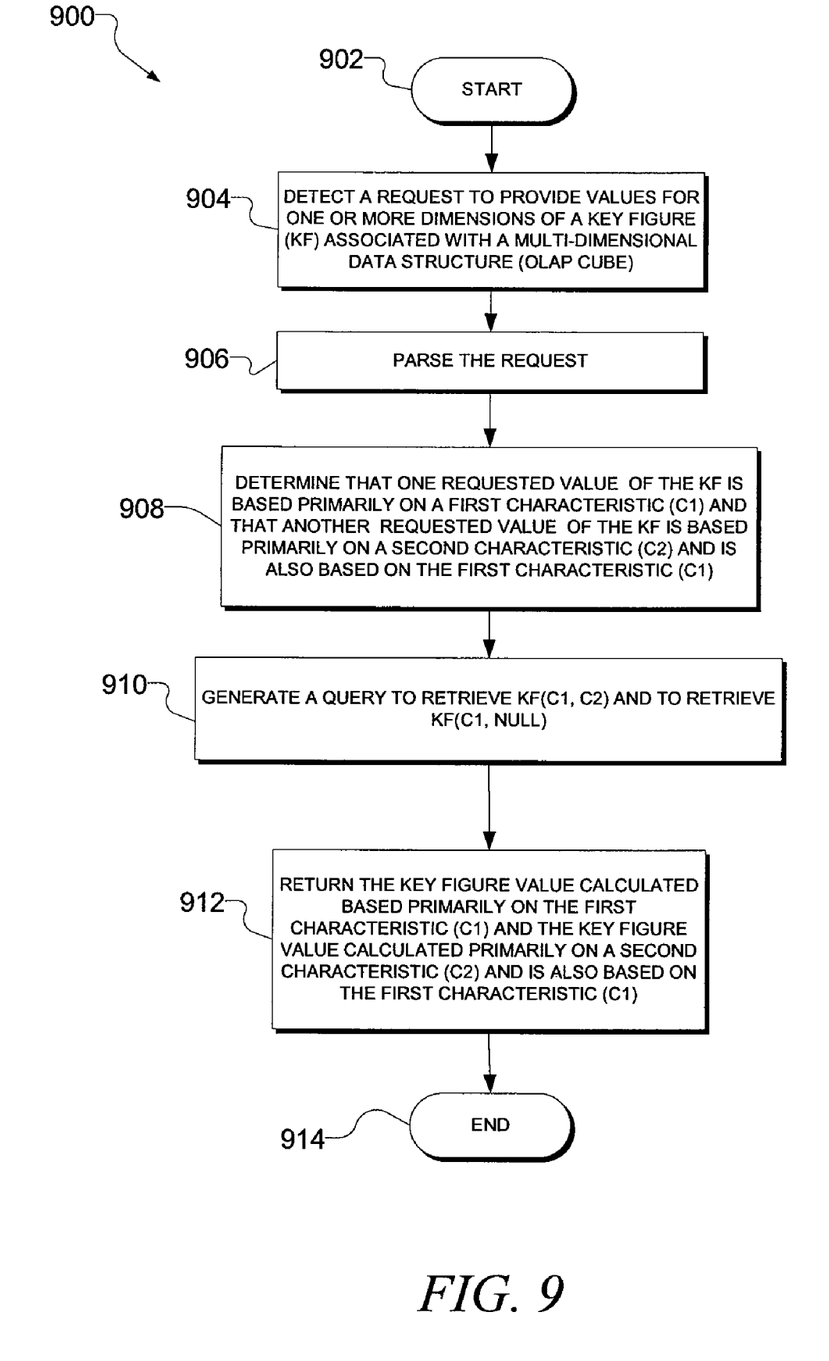
FIG. 9 is a flow chart of a method to handle queries, including queries directed at a combination cube model, according to one example embodiment.

FIG. 9 is a flow chart of a method 900 to handle queries, including queries directed at a combination cube model, according to one example embodiment. The method 900 may be performed by processing logic that may comprise hardware (e.g., dedicated logic, programmable logic, microcode, etc.), software (such as is run on a general purpose computer system or a dedicated machine), or a combination of both. In one example embodiment, the processing logic resides at the OLAP server 108 of FIG. 1 and, specifically, at the OLAP query handler 114. In another example embodiment, the processing logic may be distributed between various servers comprising the server system 108 of FIG. 1.

As shown in FIG. 9, the method 900 commences at operation 902. At operation 904, the request detector 810 detects a request to provide values for one or more dimensions of a key figure associated with a combination OLAP cube model. At operation 906, the request parser 820 parses the request and determines, at operation 908, that one requested value of the key figure KF is based primarily on a first characteristic C1 while another requested value of the key figure KF is based primarily on a second characteristic C2 and is also based on the first characteristic C1. At operation 910, the query generator 830 generates a query to retrieve KF(C1, C2) and KF(C1, NULL). At operation 912, the retrieval module 840 retrieves and returns a value of the key figure KF that is based primarily on C1 and the other requested value of the key figure KF that is based primarily on a C2 and is also based on C1. The method 900 ends at operation 914.

FIG. 10 is an example view 1000 generated in response to a request from the OLAP client 104 of FIG. 1. In FIG. 10, the "Amount" characteristic 1002 is the requested key figure. As shown in FIG. 10, the requested key FIG. 1002 is qualified by a number of dimensions, such as a "Bucket" characteristic 1004, an "Item" characteristic 1006, a "Financial Category" characteristic 1008, a "Financial View" characteristic 1010, and a "Calendar Year" characteristic 1012. The "Item" characteristic 1006 may be designated as "Not Assigned," which, in one example embodiment, corresponds to a NULL dimension of the "Item" characteristic 1006. The view 1000 reflects amount values associated with individual "Item" members (for MacBook Pro and Mac mini), as well as the amount values associated with the entire "Bucket" category. The view 1000 may be generated utilizing the methods and systems described herein.

In various example embodiments, methods may be performed by processing logic that may comprise hardware (e.g., dedicated logic, programmable logic), firmware (e.g., microcode, etc.), software (e.g., algorithmic or relational programs run on a general purpose computer system or a dedicated machine), or a combination of the above. It will be noted that, in an example embodiment, the processing logic may reside in any of the modules described herein.

Figure 11:
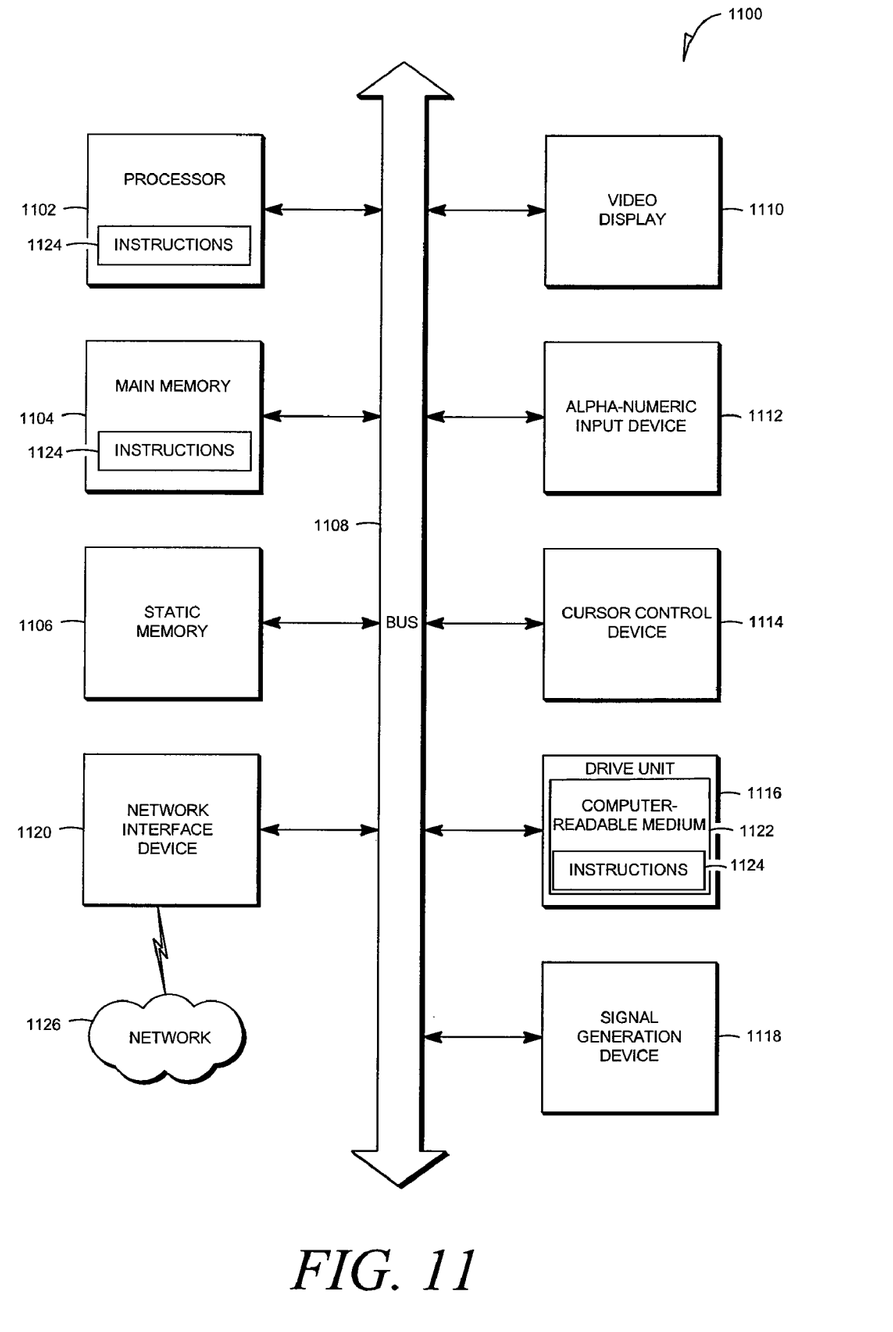
FIG. 11 is a block diagram of machine in the example form of a computer system within which a set of instructions, for causing the machine to perform any one or more of the methodologies discussed herein, may be executed.

FIG. 11 is a block diagram of machine in the example form of a computer system 1100 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols (e.g., Hyper Text Transfer Protocol (HTTP)).

In one example embodiment, a machine-readable medium is provided having instruction data to cause a machine to determine that the multi-dimensional data structure is to include a multi-dimensional key figure, a first dimension of the key figure being based primarily on a first characteristic and a second dimension of the key figure being based primarily on a second characteristic; augment a set of members associated with the second characteristic with a NULL member; generate a value for each dimension of the key figure, a value of the key figure being determined by a pair made up from a member of the first characteristic and a member of the second characteristic; and arrange the key figure, the first characteristic, and the second characteristic into the requested multi-dimensional data structure.

In a further example embodiment, a machine-readable medium is provided having instruction data to cause a machine to receive a request for data against a multi-dimensional data structure, the multi-dimensional data structure including a multi-dimensional key figure, a first dimension of the key figure being based primarily on a first characteristic and a second dimension of the key figure being based primarily on a second characteristic; determine that the request references a first member of the first characteristic and a NULL member of the second characteristic; and return, responsive to the request, a key figure value based primarily on the first member of the first characteristic.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices and can operate on a resource (e.g., a collection of information).

Although an embodiment of the method and system to process multi-dimensional data has been described with reference to specific example embodiments, it will be evident that various modifications and changes may be made to these embodiments without departing from the broader spirit and scope of the method and system described herein. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
  detecting a request to generate a multi-dimensional data structure;
  determining that the multi-dimensional data structure is to include a multi-dimensional key figure, a first dimension of the key figure being based primarily on a first characteristic and a second dimension of the key figure being based primarily on a second characteristic;
  augmenting a set of members associated with the second characteristic with a NULL member, the NULL member representing a collection of all members in the set of members associated with the second characteristic;
  generating a value for each dimension of the key figure, a value of the key figure being determined by a pair made up from a member of the first characteristic and a member of the second characteristic; and
  arranging the key figure, the first characteristic, and the second characteristic into the requested multi-dimensional data structure.

2. The method of claim 1, including storing the multi-dimensional data structure within a storage device.

3. The method of claim 1, wherein the generating of the multi-dimensional data structure includes generating a cube data structure.

4. The method of claim 3, wherein the generating of the cube data structure includes generating an On-line Analytical Processing (OLAP) cube.

5. The method of claim 1, wherein:
  the members of the second characteristic are associated with a first member of the first characteristic; and
  the generating of a value for a dimension of the key figure based on the first member of the first characteristic and the NULL member of the second characteristic includes generating a value based primarily on the first member of the first characteristic.

6. The method of claim 5, wherein the generating of the value based primarily on the first member of the first characteristic includes generating a value based on a sum of values generated for the members of the second characteristic.

7. The method of claim 5, wherein the first member of the first characteristic is the only member of the first characteristic.

8. The method of claim 1, including:
  receiving a query against the multi-dimensional data structure that references a first member of the first characteristic and a first member of the second characteristic; and
  returning, responsive to the query, a key figure value based primarily on the first member of the second characteristic.

9. The method of claim 1, including:
  receiving a query against the multi-dimensional data structure that references a first member of the first characteristic and the NULL member of the second characteristic; and
  returning, responsive to the query, a key figure value based primarily on the first member of the first characteristic.

10. The method of claim 1, including:
  receiving a query against the multi-dimensional data structure that references a first member of the first characteristic and one of a first member of the second characteristic and the NULL member of the second characteristic; and
  returning, responsive to the query, a key figure value based primarily on the first member of the first characteristic and key figure value based primarily on the first member of the first characteristic.

11. The method of claim 10, wherein the returning of the key figure responsive to the query includes generating a single table including one or more values of the key figure and presenting the single table to a user.

12. A method comprising:
  receiving a request for data against a multi-dimensional data structure, the multi-dimensional data structure including a multi-dimensional key figure, a first dimension of the key figure being based primarily on a first characteristic and a second dimension of the key figure being based primarily on a second characteristic;
  determining that the request references a first member of the first characteristic and a NULL member of the second characteristic, the NULL member representing a collection of all members in the set of members associated with the second characteristic; and
  returning, responsive to the request, a key figure value based primarily on the first member of the first characteristic.

13. The method of claim 12, wherein the returning of the key figure responsive to the query includes generating a single table including one or more values of the key figure and presenting the single table to a user.

14. The method of claim 12, wherein the multi-dimensional data structure is a cube data structure.

15. The method of claim 12, wherein the cube data structure is an On-line Analytical Processing (OLAP) cube.

16. The method of claim 12, wherein:
  members of the second characteristic are associated with a first member of the first characteristic; and
  a value for a dimension of the key figure based on the first member of the first characteristic and the NULL member of the second characteristic is a sum of values generated for the members of the second characteristic.

17. The method of claim 12, wherein the first member of the first characteristic is the only member of the first characteristic.

18. A method comprising:
  detecting a request to generate a multi-dimensional data structure;
  determining that the multi-dimensional data structure is to include a multi-dimensional key figure, a first dimension of the key figure being based primarily on a first characteristic and a second dimension of the key figure being based primarily on a second characteristic;
  generating a value for each dimension of the key figure, a value of the key figure being determined by a pair made up from a member of the first characteristic and a member of the second characteristic;

generating a value for an additional dimension of the key figure, the value for the additional dimension of the key figure being determined by a pair made up from a member of the first characteristic and a NULL member in place of the second characteristic, the value for the additional dimension of the key figure being determined based primarily on the member of the first characteristic, the NULL member representing a collection of all members in the set of members associated with the second characteristic; and arranging the key figure, the first characteristic, and the second characteristic into the requested multi-dimensional data structure.

19. A machine-readable non-transitory storage medium having instruction data to cause a machine to:

detect a request to generate a multi-dimensional data structure;

determine that the multi-dimensional data structure is to include a multi-dimensional key figure, a first dimension of the key figure being based primarily on a first characteristic and a second dimension of the key figure being based primarily on a second characteristic;

augment a set of members associated with the second characteristic with a NULL member, the NULL member representing a collection of all members in the set of members associated with the second characteristic;

generate a value for each dimension of the key figure, a value of the key figure being determined by a pair made up from a member of the first characteristic and a member of the second characteristic; and arrange the key figure, the first characteristic, and the second characteristic into the requested multi-dimensional data structure.

* * * * *